United States Patent [19]

Smith

[11] 4,257,706
[45] Mar. 24, 1981

[54] MOTOR VEHICLE BACK-UP LIMIT GAUGING METHOD AND APPARATUS

[76] Inventor: Robert L. Smith, 3725 Walnut Ave., Concord, Calif. 94520

[21] Appl. No.: 119,040

[22] Filed: Feb. 6, 1980

[51] Int. Cl.$^3$ .............................................. G01C 5/00
[52] U.S. Cl. ...................................... 356/3; 33/264; 116/28 R; 356/375; 356/399
[58] Field of Search ............... 33/264, 286; 116/28 R, 116/202; 356/3, 18, 375, 399; 350/302

[56] References Cited

U.S. PATENT DOCUMENTS

| | | | |
|---|---|---|---|
| 1,782,988 | 11/1930 | Johnson | 33/264 |
| 3,199,487 | 8/1965 | Heinkel | 116/28 R |
| 3,485,555 | 12/1969 | Morris | 350/302 |
| 3,704,063 | 11/1972 | Guthrie | 350/302 |
| 3,765,703 | 10/1973 | Voelkerding et al. | 116/28 R |
| 4,054,302 | 10/1977 | Campbell | 116/28 R |

Primary Examiner—R. A. Rosenberger
Attorney, Agent, or Firm—Rankin A. Milliken

[57] ABSTRACT

Motor vehicle back-up limit gauging methods and apparatus are disclosed which include a pair of line-of-sight indicators affixed to the left side of the vehicle in such positions that the driver of the vehicle when seated in the driving position may establish a line-of-sight by aligning these indicators through the existing rear view mirror, and may then back his vehicle to a safe distance from a building wall or other marker by halting the backward progress of the vehicle when the aligned indicators coincide with the ground line of the wall, or with the marker.

10 Claims, 11 Drawing Figures

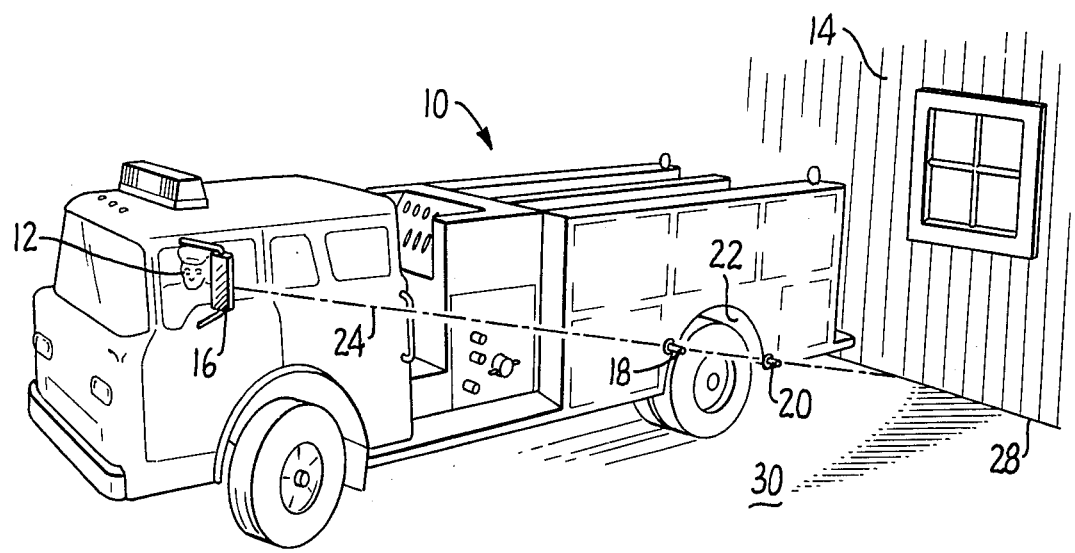
FIG. 1.
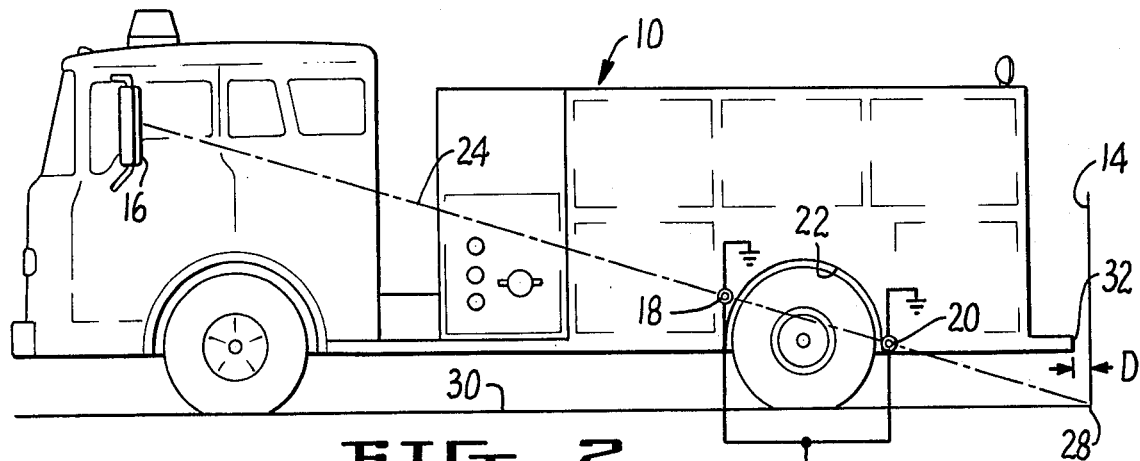
FIG. 2.
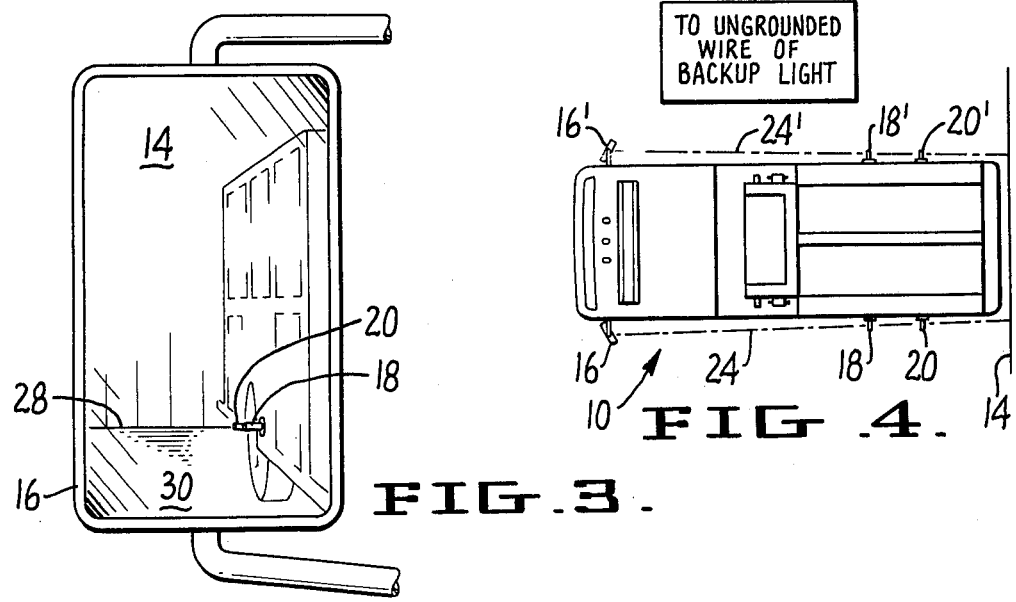
FIG. 3.
FIG. 4.

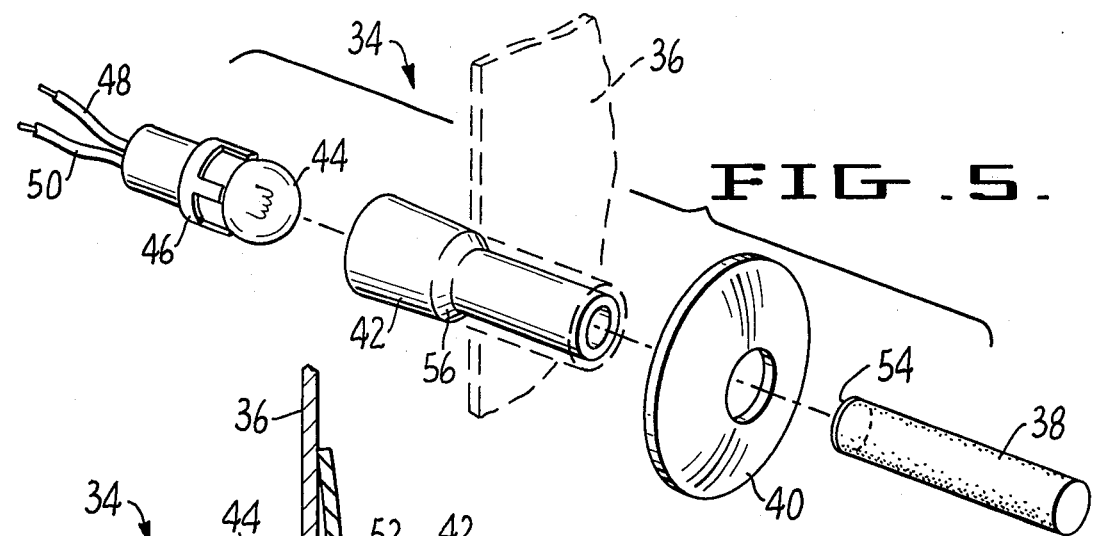
FIG. 5.
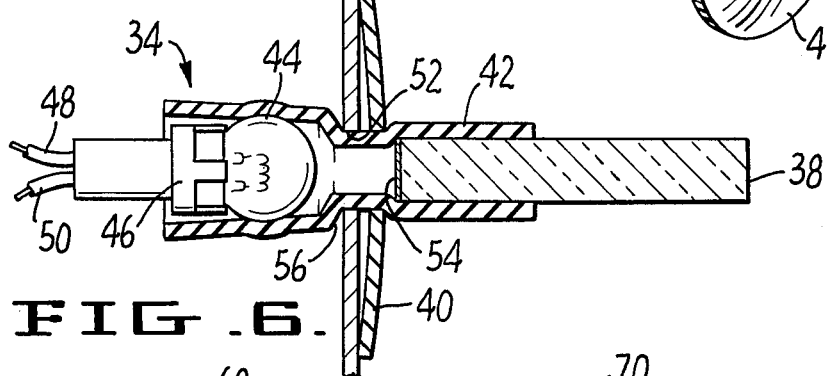
FIG. 6.
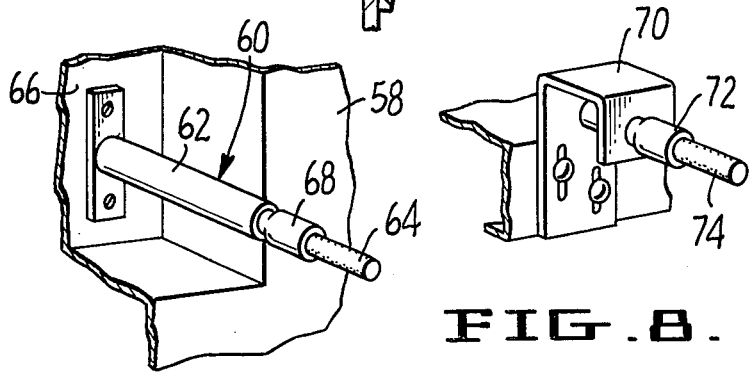
FIG. 7.
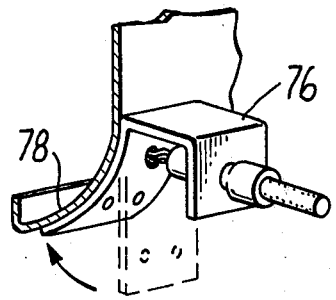
FIG. 8.
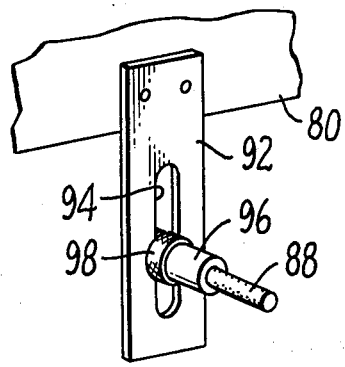
FIG. 9.
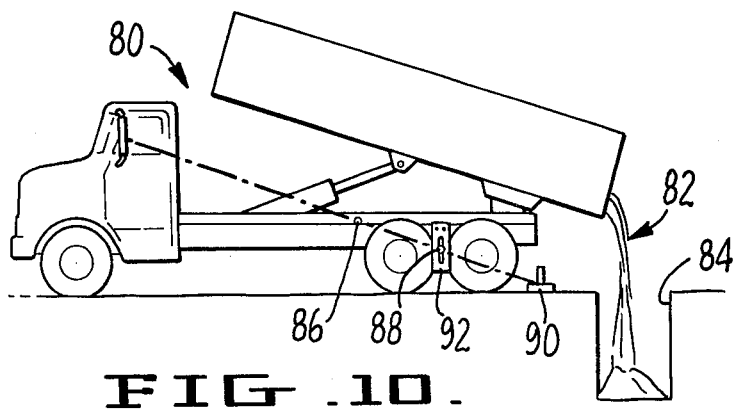
FIG. 10.
FIG. 11.

MOTOR VEHICLE BACK-UP LIMIT GAUGING METHOD AND APPARATUS

BACKGROUND OF THE INVENTION

1. Field of the Invention

My invention relates to methods and apparatus for assisting motor vehicle operators in safely operating their vehicles, and more particularly to methods and apparatus for enabling motor vehicle operators to back their vehicles into pre-determined close proximity to buildings, walls, or other obstacles, without striking the same. My invention further particularly relates to methods and apparatus for enabling the operators of dump trucks and the like to back their vehicles into pre-determined close proximity to open trenches and the like, whereby to deliver their loads into said open trenches or the like with precision, and without breaking down the walls of said open trenches or the like.

2. Description of the Prior Art

It is known in the prior art to provide periscopes or open optical systems operating on the periscope principle to assist the operators of motor vehicles in backing their vehicles into close proximity to obstacles and other hazards.

For example, a prior art patent shows a delivery truck of the type used in making parcel deliveries in large cities, equipped with a periscope tube or housing which is affixed to and extends along substantially the entire length of the roof of the truck, and overhangs the rear edge of the roof of the truck. This periscope tube contains a forward mirror which coacts (through a hole in the roof of the truck) with a viewing mirror affixed to the dashboard of the truck, and also coacts with a mirror in the overhanging rearward portion of the tube, whereby the operator of the delivery truck can view the area immediately behind his truck as seen from directly overhead. As appears from the drawings of this patent, the mirrors of the periscope are quite large, apparently in order to provide a sufficiently broad field of view of the area behind the truck for the driver, and thus the top of the periscope tube is a considerable distance above the top of the truck, reducing the ability of the truck to clear the tops of tunnels and other passages, doorframes, etc. Additionally, it can be seen that the cost of installing the periscope, including the cutting of a substantial hole in the roof of the truck, is sufficiently great to prevent the widespread adoption of this prior art periscope system.

The prior art also teaches the employment of an auxiliary outside rear-view mirror mounted outboard of the left wall of the vehicle, and also outboard of the rear wall of the vehicle, and so vertically positioned that this auxiliary mirror can coact with the existing rear-view mirror to provide a periscope whereby the vehicle operator can view the area behind the vehicle while seated in the driving position.

Such prior art auxiliary outside mirrors, however, are subject to being put out of alignment or broken by impact with stationary objects or other vehicles due to the exposed location in which they are necessarily mounted, and, as will be obvious to those having ordinary skill in the art, even slight mirror mis-alignments can render these prior art systems completely inoperative.

Further, the image of the area behind the vehicle provided by these prior art systems can be obscured to the point of practical uselessness by vibration of the auxiliary mirror due to engine vibration, or the like.

Yet further, the effective aperture or viewing area of these prior art systems is seriously restricted due to the fact that the auxiliary mirror is practically limited in size by the location in which it must be mounted, which location dictates that the mirror must be small in order to minimize the possibility of its striking other vehicles or stationary objects.

SUMMARY OF THE INVENTION

It is accordingly an object of my invention to provide improved motor vehicle back-up limit gauging methods and apparatus.

It is a further object of my invention to provide motor vehicle back-up limit gauging methods and apparatus which do not involve viewing by the vehicle operator through a plurality of mirrors.

It is another object of my invention to provide motor vehicle back-up limit gauging methods and apparatus which are relatively free from the deleterious effects of vehicle vibration.

It is yet another object of my invention to provide motor vehicle back-up limit gauging methods and apparatus the parts of which project from the vehicle to a limited extent only, and are not located in critical areas of the vehicle where they are easily broken by impact with other vehicles and stationary objects.

It is an additional object of my invention to provide motor vehicle back-up limit gauging apparatus the effective operation of which is not seriously impaired by displacement of its major parts.

It is another object of my invention to provide motor vehicle back-up limit gauging apparatus the principal parts of which can be resiliently mounted on the equipped vehicle, and thus can restore themselves to their operating positions after being forcibly displaced, e.g., by brushing against a person, vehicle, or stationary object.

Other objects of my invention will in part be obvious and will in part appear hereinafter.

My invention, accordingly, comprises the features of construction, combinations of elements, and arrangements of parts which will be exemplified in the constructions hereinafter set forth, and the scope of my invention will be indicated in the appended claims.

In accordance with a principal feature of my invention a vehicle is equipped with at least one pair of sights so disposed on the driver's side of the vehicle that when the driver is seated in the driving position he can establish a line of sight by aligning said sights through the existing rear view mirror, and further so disposed that said line of sight intersects any horizontal plane surface on which the vehicle stands at a predetermined distance behind the vehicle.

In accordance with another principal feature of my invention said sights are resiliently mounted on the equipped vehicle, and thus will return to their active positions after momentary displacement by contact with persons, other vehicles, or stationary obstacles.

In accordance with yet another feature of my invention said sights are adapted to be illuminated to a low light intensity level, whereby they may be easily distinguished while backing the vehicle in the dark with the aid of the vehicle's existing backup lights.

For a fuller understanding of the nature and objects of my invention, reference should be had to the following detailed description, taken in connection with the accompanying drawings.

BRIEF DESCRIPTION OF THE DRAWINGS

FIG. 1 is a perspective view of a fire engine equipped with back-up limit gauging means embodying my invention;

FIG. 2 is a left-hand view in elevation of the fire engine of FIG. 1;

FIG. 3 illustrates the view seen in the rear-view mirror by the driver of the fire engine of FIGS. 1 and 2 when the fire engine is located at the pre-determined minimum distance from the building wall shown in FIG. 1;

FIG. 4 illustrates a fire engine provided with two of the back-up limit gauging systems of my invention, one on each of its sides;

FIG. 5 is an exploded perspective view of one of the illuminated sights of a particular embodiment of my invention;

FIG. 6 is an elevational view, partly in section, of the illuminated sight of FIG. 5, as assembled and mounted on the wall of the equipped vehicle;

FIG. 7 illustrates a mounting device which may be used to mount one of the sights of a particular embodiment of my invention on a vehicle the wall of which is recessed at the suitable point for mounting that sight;

FIGS. 8 and 9 illustrate alternative mounting brackets which may be used to mount one of the sights of my invention on the side of a vehicle;

FIG. 10 shows a dump truck equipped with back-up limit gauging means embodying my invention, and the method by which these means of my invention may be used to assist the driver of the dump truck in accurately depositing the truck's load in a ditch or the like; and FIG. 11 is a perspective view of an adjustable mounting for one of the sights of my invention, which adjustable mounting can be used in carrying out the method of dump truck load deposition illustrated in FIG. 10.

DESCRIPTION OF THE PREFERRED EMBODIMENTS

Referring now to FIG. 1, there is shown a fire engine 10 equipped with a back-up limit gauging system embodying my invention.

As seen in FIG. 1, fire engine 10 is being backed by a driver 12 toward a wall 14 of a building. As also seen in FIG. 1, fire engine 10 is provided with a conventional rear view mirror 16.

In accordance with the teachings of my invention, fire engine 10 is also provided with a pair of line-of-sight indicators, which will sometimes be called "sights" herein.

As seen in FIG. 1, the sights 18 and 20 of my invention are located closely adjacent the left rear wheel well 22 of fire engine 10. It is easily determinable by actual experience with a physical embodiment of my invention that in many cases the sights of my invention can be installed in conveniently close proximity to the rear fender or wheel well of the equipped vehicle. Thus, this feature of my invention will often make it possible to mount the sights on brackets affixed to the interior of the associated wheel well or fender, without impairing the painted exterior surface of the vehicle. At the same time, this feature of my invention will often make it possible to pass the electrical leads for providing illuminating power to the sights, as described hereinafter, through the wheel well or fender opening, rather than drilling through the vehicle body, providing necessary grommets, etc.

Returning to FIG. 1, there is also shown the line-of-sight 24, which extends from the eye of driver 12, through the conventional outside rear view mirror 16, through the sights 18 and 20 of my invention, and through the ground line 28 of wall 14, wherein wall 14 meets the substantially horizontal plane surface 30 on which fire engine 10 is standing.

As will now be evident to those having ordinary skill in the art, informed by the present disclosure, the respective positions of sights 18 and 20 on the side of fire engine 10 are so selected that line-of-sight 24 will intersect ground line 28 when plane surface 30 is horizontal and the rearmost projection of fire engine 10 (reference numeral 32, FIG. 2) is located a predetermined minimum distance E (FIG. 2) from vertical wall 14.

Referring now to FIG. 2, it will be seen that in accordance with one preferred aspect of my invention sights 18 and 20 are provided with illuminating means, and that the power for operating such illuminating means is preferably derived from a connection to the ungrounded wire of the back-up lighting system of fire engine 10, whereby sights 18 and 20 will automatically be illuminated when fire engine 10 is to be backed up, and only then. Particular sight illuminating means which constitute part of my invention are described hereinafter in connection with FIG. 5.

Referring now to FIG. 3, there is shown the view seen by driver 12 when fire engine 10 is in the position shown in FIG. 1, at which time fire engine 10 is located at the predetermined minimum distance D (FIG. 2) from building wall 14.

As seen in FIG. 3, when fire engine 10 is thus positioned, and driver 12 positions his head so that he sees sight 18 aligned with sight 20, ground line 18 will appear to be in alignment with sights 18 and 20.

As will now be understood by those having ordinary skill in the art, informed by the present disclosure, suitable locations for the sights of my invention, on any vehicle, may be selected by first locating that vehicle on a substantially horizontal, substantially plane surface at a predetermined distance D (FIG. 2) from a wall having a suitable ground line, and then manually positioning, and repositioning, the sights on the side of the vehicle in accordance with the instructions of a person sitting in the driver's seat of the vehicle, until that person perceives the sights and the ground line (through the existing rear view mirror) as being superposed, i.e., as being in alignment.

It has been determined in the actual practice of my invention that if the distance D is made sufficiently large, e.g., 24 inches, then the system of my invention is effective to enable the driver of the equipped vehicle to position the vehicle at safe distances from a wall or like obstacle located behind it even though the ground on which the vehicle is standing departs considerably from being a plane, horizontal surface.

As will also be understood by those having ordinary skill in the art, informed by the present invention, the back-up limit gauging means of my invention is useful not only in connection with emergency vehicles, such as fire engines and the like, but also is useful in connection with campers, vans, motor homes, station wagons, and even passenger vehicles such as ordinary sedans.

Referring now to FIG. 4, it will be seen that in accordance with a preferred embodiment of my invention fire engine 10, or indeed any other vehicle, may be equipped with two of the back-up limit gauging systems of my invention, one located on each side of the vehicle. Thus, fire engine 10 is shown in FIG. 4 as having a first system of my invention (unprimed numerals) on its left side, and a second system of my invention (primed numerals) on its right side.

Referring now to FIGS. 5 and 6, there is shown a line-of-sight indicator assembly or sight assembly 34 embodying certain particularly preferred features of my invention, as mounted in an opening in a wall 36 of a vehicle.

Comparing FIGS. 5 and 6, it will be seen that sight assembly 34 consists of the sight 38, a generally circular, resilient mounting member 40, an elongated, resilient mounting member 42, an incandescent lamp 44, and a lamp socket 46, which is provided with illuminating current leads 48 and 50.

As best seen in FIG. 6, sight assembly 34 is mounted in an opening 52 which is made in the wall 36 of the equipped vehicle for the purpose of mounting sight assembly 34.

Sight 38 is itself formed from transparent material, such as lucite, and is abraded or "frosted" throughout its cylindrical outer surface, in order to permit light entering sight 38 through one of its ends to escape therefrom via its cylindrical outer surface. As also seen in FIGS. 5 and 6, one end of sight 38 is provided with a transparent coating or the like 54, whereby light entering that end of sight 34, e.g., from incandescent lamp 44, will be diminished in intensity, and at the same time filtered so that the light emerging from the cylindrical outer surface of sight 38 will be of a particular predetermined color.

In accordance with the principles of my invention, the two different sights on one side of a particular vehicle will be provided with coatings or the like 54 which pass different colors, whereby these two sights, when illuminated at dusk or other times of low ambient illumination, will appear to the driver of the vehicle to be of different colors, e.g., red and amber, making it easier to distinguish between the two sights when aligning them through the existing rear view mirror of the vehicle.

As will also be evident to those having ordinary skill in the art, informed by the present disclosure, the provision of suitable coatings or filters 54, of suitable opacity, makes it possible to use a standard incandescent lamp for lamp 44, operated directly off the back-up light circuit of the vehicle, without having to provide a dimming resistor network or the like, thus avoiding extra cost and structural complexity.

As noted above, sight mounting members 40 and 42 are both fabricated from resilient material, e.g., neoprene.

As seen in FIG. 6, sight assembly 34 is mounted in opening 52 in vehicle wall 36 by frictional engagement of its parts, without the necessity for additional mounting screws or the like.

More particularly, sight mounting member 42 is first passed outwardly through opening 52 until its shoulder 56 butts against the inner surface of vehicle wall 36. Sight mounting member 40 is then passed over the portion of sight mounting member 42 projecting outwardly from wall 36 (as seen in FIG. 6) and brought to bear against the outer surface of wall 36. While members 40 and 42 remain in place, respectively abutting the inner and outer surfaces of vehicle wall 36, sight 38 is forced into the open outer end of member 42, and thrust into member 42 until it locks members 40 and 42 into opening 52, as seen in FIG. 6. After suitable connections for lamp 44 are made, in the manner indicated in FIG. 2, e.g., with lead 50 grounded to vehicle ground and lead 48 connected to the ungrounded back-up light wire of the vehicle, lamp 44, mounted in its associated socket from which leads 48 and 50 extend, is thrust into the larger end of sight mounting member 42, where it is retained by friction in its proper light-supplying relationship to the inner end of sight 38, i.e., the end supplied with filter 54, all as shown in FIG. 6.

As will now be evident to those having ordinary skill in the art, informed by the present disclosure, the sights 18 and 20 of FIGS. 1 through 3 may be substantially identical to sight assembly 34 of FIGS. 5 and 6, except that the filters 54 of sights 18 and 20 will pass two different light colors.

It is also to be particularly noted that the construction of sight assembly 34 provides the advantage that sight 38 can be accidentally displaced to a considerable angular extent, and will thereafter automatically return substantially to its proper position, without breakage or sufficient permanent displacement to substantially affect the operation of the particular installation of the back-up limit gauging system of my invention.

As will be understood, however, not all installations of my invention will be able to take advantage of the particularly convenient sight assembly construction shown in FIGS. 5 and 6. In some cases, as shown e.g., in FIG. 7, the vehicle body 58 will comprise a recess 60 at the position at which one of the sights should be mounted. In this case, it will be necessary to provide an extension such as the extension 62 shown in FIG. 7 whereby the sight 64 is supported at a suitable distance from the associated wall panel of the equipped vehicle. Even in this case, however, sight 64 may be resiliently mounted in a resilient sleeve 68, containing the associated incandescent lamp, and thus the sight displacement avoidance feature of the embodiment of FIGS. 6 and 7 may be retained.

As shown in FIGS. 8 and 9, it may be considered desirable in some applications of my invention to provide brackets whereby one or both of the sights may be mounted on the vehicle body by means of self-tapping sheet metal screws or the like. The bracket 70 of FIG. 8 is a rigid metal bracket providing openings to receive resilient sleeve 72, which itself holds sight 74, in the manner taught hereinabove. The bracket 76 of FIG. 9 contrasts with the rigid bracket 70 of FIG. 8 in that bracket 76 is subject to being bent by hand by the installer, and thus may be made to conform, e.g., to the curved lower edge of a typical vehicle body wall 78.

Referring now to FIG. 10, there is shown a method of my invention for precisely positioning a dump truck or the like 80 so that its load 82 can be completely deposited in a ditch or the like 84, and none of its load 82 deposited adjacent to ditch 84.

As seen in FIG. 10, dump truck 80 is provided with sights 86 and 88 of my invention. Further, a suitable marker 90 is positioned on the surface of the ground at a predetermined distance from the near edge of ditch 84. Thus, the driver of dump truck 80 need merely align sights 86 and 88 with marker 90 in the manner described hereinabove in connection with ground line 28, and dump truck 80 can quickly be precisely positioned to deposit its entire load in ditch 84, and to avoid breaking down the edge of ditch 84.

Referring now to FIG. 11, it will be seen that a bracket 92 can be provided which contains a slot 94 in which the sleeve containing sight 88 is locked by means of a knurled nut 98. In this way the vertical position of sight 88 can be adjusted so as to provide latitude in the placing of marker 90 (FIG. 10), or to permit the use of a single marker 90 when several dump trucks of different style are to be used together in filling ditch 84. It is to be understood that it falls within the embrace of my invention to make both sights 86 and 88 vertically adjustable on vehicle 80, or to make only sight 86, and not sight 88 vertically adjustable.

It will thus be seen that the objects set forth above, among those made apparent from the preceding description, are efficiently attained, and since certain changes may be made in the above constructions without departing from the scope of my invention, it is intended that all matter contained in the above description or shown in the accompanying drawings is to be interpreted as illustrative only, and not in a limiting sense.

It is also to be understood that the following claims are intended to cover all of the generic and specific features of my invention herein described, and all of the statements of the scope of my invention which, as a matter of language, might be said to fall therebetween.

What is claimed is:

1. In a motor vehicle, the improvement comprising:
    first line-of-sight indicating means affixed to said motor vehicle in such a location as to be visible to the driver of the vehicle in the outside rear view mirror of the vehicle when the driver is seated in the driving position;
    second line-of-sight indicating means affixed to said motor vehicle in such a location as to be visible to the driver of the vehicle in the outside rear view mirror of the vehicle when the driver is seated in the driving position and to be alignable with said first line-of-sight indicating means in said outside rear view mirror, thereby establishing a line-of-sight passing through said two line-of-sight indicating means and said outside rear view mirror;
    said line-of-sight being so directed and located with respect to said motor vehicle as to pass through a predetermined point on a horizontal plane surface on which said vehicle is standing.

2. The combination claimed in claim 1 in which said predetermined point is located at a predetermined distance behind the rearmost portion of said motor vehicle.

3. The combination claimed in claim 2 in which said line-of-sight indicating means are illuminated.

4. The combination claimed in claim 3 in which said line-of-sight indicating means are respectively illuminated with light of different colors.

5. The combination claimed in claim 3 in which said line-of-sight indicating means are illuminated from within.

6. The combination claimed in claim 4 in which said line-of-sight indicating means are illuminated from within.

7. The combination claimed in claim 2 in which said line-of-sight indicating means are affixed to said motor vehicle by resilient supporting means, whereby said line-of-sight indicating means will return to operative position after being accidentally displaced therefrom.

8. The combination claimed in claim 7 in which said line-of-sight indicating means are illuminated.

9. The combination claimed in claim 8 in which said line-of-sight indicating means are respectively illuminated by light of different colors.

10. The combination claimed in claim 9 in which said line-of-sight indicating means are illuminated from within.

* * * * *